US005420662A

United States Patent [19]

Gerstner

[11] Patent Number: 5,420,662

[45] Date of Patent: May 30, 1995

[54] PRINTER OR COPIER WITH AN ARRANGEMENT FOR PRINTING BOTH SIDES OF A RECORDING MEDIUM

[75] Inventor: Albrecht Gerstner, Mühldorf, Germany

[73] Assignee: Siemens Nixdorf Informationssysteme Aktiengesellschaft, Paderborn, Germany

[21] Appl. No.: 211,697

[22] PCT Filed: Sep. 24, 1992

[86] PCT No.: PCT/EP92/02214

§ 371 Date: Apr. 13, 1994

§ 102(e) Date: Apr. 13, 1994

[87] PCT Pub. No.: WO93/08511

PCT Pub. Date: Apr. 29, 1993

[30] Foreign Application Priority Data

Oct. 15, 1991 [EP] European Pat. Off. ...... 91117565 U

[51] Int. Cl.[6] ...................... G03B 27/32; G03G 15/00

[52] U.S. Cl. ...................................... 355/23; 355/271; 355/279; 355/319; 355/24

[58] Field of Search ................... 355/23, 24, 319, 271, 355/272, 273, 277, 279, 313

[56] References Cited

U.S. PATENT DOCUMENTS

| | | | |
|---|---|---|---|
| Re. 32,422 | 5/1987 | DiFrancesco et al. | 430/126 |
| 2,990,278 | 6/1961 | Carlson . | |
| 3,506,347 | 4/1970 | Carlson . | |
| 3,893,761 | 7/1975 | Buchan et al. | 355/272 |
| 3,923,392 | 12/1975 | Buchan et al. | 355/271 |
| 4,439,462 | 3/1984 | Tarumi et al. . | |
| 4,448,872 | 5/1984 | Vandervaik . | |
| 4,477,176 | 10/1984 | Russel . | |
| 4,537,493 | 8/1985 | Russel . | |
| 4,688,925 | 8/1987 | Randall | 355/319 |
| 4,714,939 | 12/1987 | Ahern et al. | 355/24 X |
| 5,027,159 | 6/1991 | Oda et al. | 355/271 |
| 5,070,371 | 12/1991 | Randall | 355/272 |
| 5,070,372 | 12/1991 | Randall | 355/272 |
| 5,138,363 | 8/1992 | Yuge | 355/24 |
| 5,138,389 | 8/1992 | Randall | 355/272 |

FOREIGN PATENT DOCUMENTS

| | | |
|---|---|---|
| 3940217 | 6/1990 | Germany . |
| 59-77467 | 5/1984 | Japan . |
| 61-117582 | 6/1986 | Japan . |
| 2040226 | 8/1980 | United Kingdom . |
| WO82/00723 | 3/1982 | WIPO . |
| WO92/10793 | 6/1992 | WIPO . |

*Primary Examiner*—Matthew S. Smith

*Attorney, Agent, or Firm*—Hill, Steadman & Simpson

[57] ABSTRACT

A printer or copier operating according to the transfer printing principle containing an arrangement for printing the front and/or the back of a recording medium. The apparatus contains a photoconductor drum and a thermoadhesive transfer ribbon which is coupled to the photoconductor drum. The transfer ribbon proceeds to a transfer printing and fusing station formed by the transfer ribbon on one side and a heated roller on an opposite side in elastic contact thereto. A first toner image for the back of the recording medium and a second toner image for the front of the recording medium are produced on a photoconductor drum and transferred to the transfer ribbon in this order. The heated roller first receives a toner image for the back of the recording medium. Thereafter, the recording medium is fed to the fusing gap and simultaneous transmission and fusing of the toner image on both sides of the recording medium takes place by the transfer ribbon and the heated roller moving across both sides of the recording medium.

20 Claims, 1 Drawing Sheet

PRINTER OR COPIER WITH AN ARRANGEMENT FOR PRINTING BOTH SIDES OF A RECORDING MEDIUM

BACKGROUND OF THE INVENTION

The invention relates to an arrangement for printing the front or the back of a recording medium in a printer or copier which operates according to the transfer printing principle and to a method for operating an arrangement of this kind.

Printers or copiers for simplex or duplex printing are disclosed for example in U.S. Pat. No. 4,477,176 and U.S. Pat. No. 4,537,493. These are electrophotographic printing devices with a photoconductor on which at least two charge images can be arranged one behind the other, the said printing devices also having a transfer printing station with associated single-sheet positioning device (turning device) which permits the electrophotographic printing device to be operated in two operating modes, specifically, in a first operating mode in which the inked-in toner images which are arranged one behind the other on the charge image carrier are arranged one on top of the other or next to one another on one side of the single sheet, and in a second operating mode in which the sequence of toner images located on the charge image carrier are arranged on the front and the back of the single sheet. The fusing of the toner images on the single sheets is carried out with the aid of a roller fusing station using pressure and high temperatures.

In the duplex printing operating mode in which one toner image is arranged on each side of the single sheet, the fusing of the front and back takes place simultaneously. For this purpose, the single sheet which is printed on one side must be turned and printed again on the other side, and it is subsequently conveyed in a contactless fashion to the roller fusing station, for example by means of an air cushion.

This requires a very high degree of mechanical expenditure if a high degree of operating reliability is to be ensured over a large range of print matter.

It is to be generally noted that any braking, accelerating and turning device in the printer or copier exerts forces on the recording medium which make exact positioning of the recording medium, and thus reliable guidance of the recording medium in the copier or printer, more difficult. This increases the risk of blockages considerably, which can lead to frequent equipment failures. Turning, before fusing, a recording medium provided with toner images requires a considerable degree of expenditure control in order to prevent the toner images becoming blurred.

Furthermore, U.S. Pat. No. 2,990,278 and GB-A-2,040,226 disclose electrophotographic printing devices in which character-dependent charge images are produced on a photoconductor with the aid of an exposure device and are fed to a developer station. The developed charge image is then mechanically lifted off from the photoconductor using pressure with the aid of a ribbon-shaped transfer element and transmitted to a recording medium. In order to be able to fuse the toner image on the recording medium, the toner image is heated on the ribbon-shaped transfer element with the aid of a heating device and the heated toner image is applied to the recording medium by means of a roller arrangement using pressure and heat. After the transfer of the toner image onto the recording medium, the ribbon-shaped transfer element is cleaned of adhering toner in a cleaning station.

WO 82/00723 discloses an arrangement and a method for printing a recording medium on both sides. In this process, a charge image is generated on a photoconductor and then, with the aid of this charge image, an electrostatic charge image is produced on a dielectric roller or drum by ionography. It is also possible to form the charge image directly on the dielectric roller by means of an ion generator. After development with the aid of a developer station by applying a single layer of toner of a single-component developer, the single-layer toner image which is associated with the back of the recording medium is transferred, using pressure only and without heat, onto a recording roller arranged underneath the dielectric roller. Afterwards, in the same way, a toner image which is associated with the front of the recording medium is formed on the dielectric roller and then, again using pressure only and without heat the two toner images are simultaneously transferred to the front and back of the recording medium.

SUMMARY OF THE INVENTION

The object of the invention is to provide an arrangement for printing the front and/or the back of a recording medium in a printer or copier operating according to the transfer printing principle, and a method for operating an arrangement of this kind which permits simultaneous printing and fusing of the recording medium on the front and the back in only one operational procedure.

A further object of the invention is to achieve, with a minimum degree of expenditure on control, optimum accuracy of fit of the print images on the recording medium.

The object of the invention is achieved by an arrangement for single-color or multi-color printing the front and back of a recording medium in a printer or copier operating according to the transfer printing principle having an electrophotographic device with a photoconductor for producing a sequence of toner images on the photoconductor. A transfer printing and fusing station is provided having a transfer printing and fusing gap assigned thereto for transferring toner images to a recording medium such as a piece of paper.

A transfer ribbon having associated electrostatic transfer means receives toner images from the photoconductor and conveys the toner images to the transfer printing and fusing station. One or more heating devices can be used for heating the toner images in such a way that they are in a pasty, sticky state. The transfer printing and fusing gap, which is assigned to the transfer printing and fusing station, is formed by the transfer ribbon on one side and a transfer printing and fusing element on an opposite side, arranged in such a way that the transfer ribbon and the transfer printing and fusing element are supported elastically on one another.

The transfer printing and fusing element and the transfer ribbon have surfaces which receive the toner images of such a quality that, on contact with the transfer ribbon, the transfer printing and fusing element removes a warm toner image which is arranged on the transfer ribbon and is in a pasty, sticky state. A recording medium conveying device is provided for feeding the recording medium to the transfer printing and fusing gap such that, as the recording medium passes through the gap, the transfer printing and fusing element and the transfer ribbon roll on the recording medium and, in this process, the warm toner images are transferred to the recording medium.

Advantageously, the transfer printing and fusing element is constructed as a heated roller or a heated ribbon. The transfer printing and fusing element has a circumferential length which is determined in accordance with a strictly prescribed consecutive spacing of image areas which receive the tone images on the photoconductor. A cleaning device can be provided which is assigned to the transfer printing and fusing element and can be activated as required. A heating device can be provided assigned to the transfer printing and fusing station and/or to the transfer ribbon. A preheating device which preheats the recording medium can advantageously be used before the recording medium is fed to the fusing gap. The surface layer of the transfer ribbon can comprise a silicon or silicon-like material and a surface layer of the transfer printing and fusing element can comprise a fluoroplastic containing surface layer.

The invention permits simultaneous print transfer with simultaneous fusing in only one operational procedure. The recording medium can move in a completely straight path through the printer or copier at a continuous speed. No accelerating and braking processes are necessary to print and fuse the recording medium. A turning device can be dispensed with.

By virtue of the rigid, geometrically accurately determined process, a high degree of accuracy of fit with a minimum degree of expenditure on control is achieved.

Both upstream and downstream of the transfer printing and fusing station there is no print image on the recording medium to become blurred. Thus, it is possible to guide and convey the recording medium on both sides both upstream and downstream of the transfer printing and fusing station.

The single processing procedure for simultaneous transfer printing on both sides using low-temperature fusing leads to non-wearing processing of the recording medium. As a result, warping and distortions in the recording medium are prevented.

The arrangement permits full-color printing without additional expenditure in the transfer printing and fusing station.

In an appropriately selected material combination of the surfaces of the transfer ribbon which bear the toner images, and of the transfer printing and fusing element it is possible, if desired, to dispense with the arrangement of an additional cleaning device for these components of the printer or copier.

One embodiment of the invention is illustrated in the drawings and is described in greater detail below by way of example.

DETAILED DESCRIPTION OF THE PREFERRED EMBODIMENTS

Figure 1:
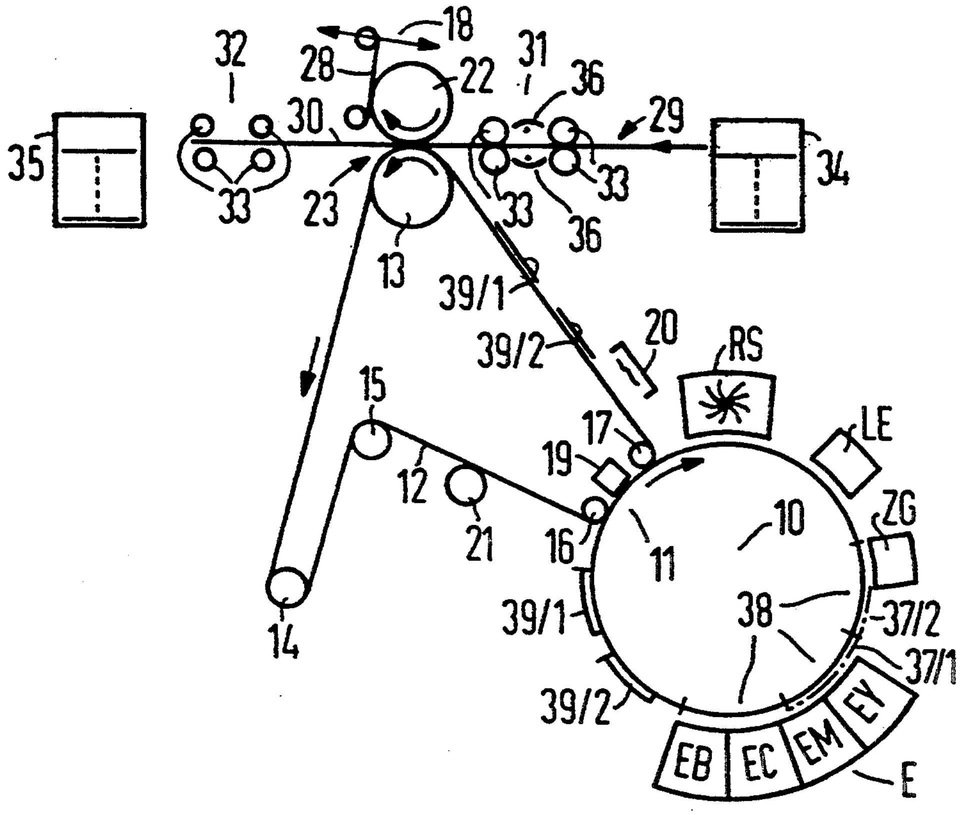
FIG. 1 shows a diagrammatic sectional view of an arrangement for printing the front and/or the back of a recording medium in a printer operating according to the transfer printing principle.

The illustrated electrophotographic single-sheet printing device for single-color or multi-color printing of single sheets in simplex mode or duplex mode contains an intermediate carrier 10 in the form of a photoconductor drum which is driven by electric motor. However, instead of the photoconductor drum an OPC ribbon can also be arranged. Grouped round the first intermediate carrier 10 are the various assemblies for the electrophotographic process. These are essentially: a charging device LE in the form of a charging corotrone for charging the intermediate carrier 10; a character generator ZG with an LED comb for character-dependent exposure of the intermediate carrier 10; developer stations EY, EM, EC and EB for inking in the charge images, which are produced with the aid of the character generator ZG and discharged in a character-dependent fashion, on the intermediate carrier 10 with colored toner. The developer station EY contains yellow toner, the developer station EM contains toner of the color magenta, the developer station EC contains toner of the color cyan and the developer station EB contains black toner. In order to remove the residual toner after development and transfer printing, a cleaning station RS is provided with cleaning brush integrated therein with associated suction device and a discharge device (not illustrated here). The developer stations EY, EM, EC and EB are designed to be replaceable and can be pulled out of, and pushed into the printer or copier, for example by means of sliding guides. They are designed in the customary fashion and contain developer rollers for inking in the charge image. They can be driven individually and can be operated or activated together or individually, A transfer ribbon 12 is coupled to the intermediate carrier 10 by means of a transfer station 11. The transfer ribbon 12 can be constructed as a thermoadhesive transfer ribbon with a temperature-resistant carrier fabric, for example made of glass fiber fabric or temperature-resistant plastic, with an elastic cover layer of silicone or silicone-like material, for example rubber, arranged thereon. The transfer ribbon 12 is also driven by electric motor and is guided by means of deflection rollers 13, 14, 16 and 17. The deflection roller 13 is a component of a transfer printing and fusing station 18. It has a relatively large diameter and can be designed so as to be of heatable design in the form of a deflection roller. For this purpose, the deflection roller can contain a heater in the form of a radiator. The deflection rollers 16 and 17 are components of the transfer station 11 which, in the case illustrated, contains a transfer corotrone 19. However, it is also possible to arrange, instead of an electrostatic transfer station of this kind, a mechanical transfer station in which, by means of contact between the transfer ribbon 12 and intermediate carrier 10, the toner images which are developed on the intermediate carrier 10 are transferred to the transfer ribbon 12. Furthermore, the transfer ribbon is also assigned a heating station 20 with infrared heat source arranged therein and, if required, a cleaning device 15, 21 for the transfer ribbon, e.g. in the form of cleaning rollers.

Figure 2:
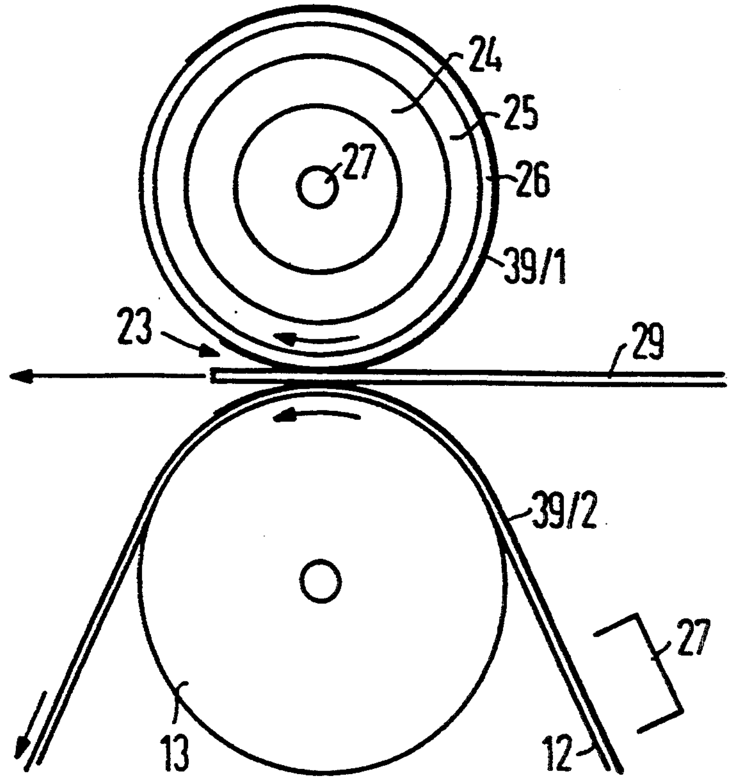
FIG. 2 shows a diagrammatic side view of the transfer printing and fusing station used in the arrangement in FIG. 1.

Arranged in the region of the transfer printing and fusing station 18, parallel to the deflection roller 13, is a transfer printing and fusing element 22 in the form of a heated transfer printing roller. It is guided on both sides and is supported by means of an elastic suspension on the deflection roller 13 and thus on the transfer ribbon 12. It can also be driven by electric motor. The region between the deflected transfer ribbon 12 or the deflection roller 13 and the transfer printing roller 22 is designated here as a transfer printing and fusing gap 23. The design of the transfer printing roller 22 is for example that illustrated in FIG. 2. It consists of a metallic hollow roller 24 made of aluminum with an elastic layer arranged thereon, for example made of rubber 25 and an outer layer 26 made of fluoroplastics. The fluoroplastics-containing outer layer can be for example of a thickness 200 to 500 μm, "Teflon" being possible for use as a fluoroplastics-containing material. Teflon refers here to a trade name of Du Pont. Fluoroplastics-containing materials are for example materials made of tetrafluoroethylene, photopolymers of tetrafluoroethylene and hexafluoropropylenes and similar materials. The hollow roller 24 can be of a thickness of 2 to 5 mm, the rubber layer 25 can for example be of a thickness of 200 to 500 μm. However, other dimensions are also possible, such as are described for example in EP-B1-0 186 314. Arranged in the hollow roller 24 is a heating device 27 in the form of a heating radiator. It is also possible to heat the hollow roller 24 from the outside.

A cleaning device 28, e.g. in the form of a moving nonwoven belt or in the form of brushes can be arranged for the purpose of cleaning the transfer printing roller 22. The cleaning device 28 can be pivoted onto and away from the transfer printing roller 22 in the directions of the arrows illustrated in FIG. 2 with the aid of a pivoting-on and pivoting-away mechanism.

A paper channel 30 is provided for feeding a recording medium 29 in the form of a single sheet or several single sheets arranged one next to the other to the transfer printing and diffusing gap 23 and has recording medium conveying devices 31 and 32 which are assigned to the paper channel and have for example paper conveying rollers 33 or conveying belts which engage on both sides of the paper channel 30. These recording medium conveying devices convey the single sheets 29 from a supply area 34 to the transfer printing and fusing gap 23 and from there onwards to a stacking device 35. A pre-heating device 36 for the recording medium can be assigned to the recording medium conveying device 31 which is mounted upstream of the transfer printing and fusing station 18 in the direction of conveyance of the recording medium. This pre-heating device 36 can be designed to correspond to the heating station 20 and it can have radiator elements arranged on each side of the paper conveying channel 30. Instead of separate radiators, it is also possible to heat e.g. the paper conveying rollers 33 of the recording medium conveying device 31.

The function of the arrangement will now be described below with reference to different operating modes. Here, the recording medium 29 to be printed is fed in the form of a single sheet to the transfer printing and fusing station 18 in such a way that its back is directed upwards and its front is directed downwards. In this way, the recording medium 29 is stacked face down in the stacking device 35. However, the terms "front" and "back" are to be understood in a relative fashion in order to describe the two opposite surfaces of the recording medium.

In order to reduce the expenditure in terms of control and in order to achieve a high accuracy of fit, the present printer or copier has a format-independent printing output. This means that within a specific time, a specific number of single sheets can be printed irrespective of the size of the formats, whether A4 or A5 or US formats. Thus, the printing output is orientated with respect to the processing speed of the largest possible format. The single sheets 29 of different format are thus fed to the transfer printing and fusing station 18 with a strictly prescribed timing code in strictly prescribed timing windows and printed within these fixed timing windows irrespective of their format size.

For this purpose, image areas 38, within which charge images 37/1, 37/2 can be produced at any desired point by means of the character generator ZG by exposing the photoconductor drum 10, are defined on the photoconductor 10, clocked by the control of the printer or copier. In this way, the largest possible charge image which can be produced is also determined by the image areas. The image areas 38 of constant size become formed into continuous rows under their constant length designated by consecutive spacing. The consecutive spacing must be dimensioned such that it is greater than the largest possible recording medium format to be processed. The size of the image areas, and thus of the consecutive spacing, is determined such that the customary DIN and US formats produce a maximum printing output and thus the predetermined image areas, and therefore the largest charge image which can be produced, is utilized to a maximum degree.

By means of this measure, the single sheets of different formats can be continuously fed to the printer or copier in a rigid time sequence predetermined by the geometry and printed. This reduces the expenditure in terms of control considerably. In this process, the single sheets can be fed by their front edges so as to be rigidly geometrically synchronized with the start of the image areas 38, that is to say the single sheets are fed to the transfer printing and fusing station 18 by their front edge and printed in accordance with the fixed timing sequence of the edges of the image areas. In order to achieve this synchronization and timing sequence, the circumferential length of the transfer printing and fusing element and thus of the transfer printing roller is matched to the required length of the image areas 38 and thus to the strictly prescribed consecutive spacing.

Single-color duplex printing operating mode

In the single-color duplex printing operating mode, the latent character images on the back 37/1 and the front 37/2 of a sequence of single sheets 29 to be printed are produced one after another by exposure in the image areas 38 of the photoconductor 10, specifically, first the back 37/1 followed by the front 37/2, etc. The latent character images are then inked in with toner by one of the developer stations EB to EY as a function of the desired color and toner images 39/1 and 39/2 are thus produced. The toner images 39/1 and 39/2 are then electrostatically transferred to the transfer station 11 on the transfer ribbon 12. The transfer ribbon 12 is in a hot state. It is kept at this temperature by the heating device 20. In this way, firstly back information and then front information is transferred to the transfer ribbon 12. As a result of the effect of the heating device 27, the toner images change their state, they become pasty. The transfer ribbon 12 conveys the toner images to the back 39/1 and to the front 39/2 which follow one another directly in the transfer printing and fusing gap 23. The outer layer 26 of the transfer printing roller 22 which consists of fluoroplastics lifts off the toner image of the back 39/1 from the transfer ribbon 12. It now adheres to the outer face of the transfer printing roller 22. Since the circumferential length of the transfer printing roller 22 corresponds to the consecutive spacing and thus to the length of the image areas 38, the start of the back toner image 39/1 reaches the fusing gap 23 again after one rotation of the transfer printing roller 22. At this time, the start of the front toner image 39/2 is also in the same position in the fusing gap 23, as is the front edge of the recording medium 29 to be printed. In accordance with the illustration in FIG. 2, the transfer printing roller 22 and the transfer ribbon 12 with the toner images 39/1 of the back and of the front 39/2 arranged on them roll on the single sheet 29 and simultaneously print both sides of it. In order to promote fusing, the recording medium can be pre-heated by means of the heating device 36 (pre-heating device) before it is fed to the transfer printing and fusing station 18. The warm single sheet coincides with the pasty toner image of the back 39/1 and the pasty toner image of the front 39/2. The print information can thus be fused immediately with the transfer onto the recording medium at low influencing temperatures.

In the described duplex mode, operations occur with a timing sequence with which a single sheet is fed after each second toner image. The single sheets are guided in a straight fashion in the paper conveying channel 30 and the conveying speed is continuous. As a result of the rigid geometrically exactly determined sequence, a high degree of accuracy of fit is achieved. Recording media are printed in a non-damaging fashion since the temperatures are low and in duplex mode it is only necessary to pass through the transfer printing and fusing station 18 once.

Single-color simplex mode operation

In the single-color simplex mode operation, the corresponding charge images are produced one behind the other in the image areas 38, inked in in the developer station E according to the desired color, transferred to the transfer ribbon 12 and, in the illustrated case, transferred onto the fronts of the single sheets fed one behind the other.

As a result of the continuous feeding of the single sheets, no undesired transfer of toner images onto the transfer printing roller 22 assigned to the back takes place.

As a result of the selected material combination of the outer face of the transfer printing roller 22 and the outer face of the transfer ribbon 12, the toner images are normally transferred completely to the single sheets 29 without residues of the toner remaining on the transfer ribbon 12 or the transfer printing roller 22. Faults occurring in the electrophotographic process can, however, lead to a build up of toner at fault points which may on occasion lead to residues of toner remaining on the transfer printing roller or the transfer ribbon 12. In order to remove these toner residues, a cleaning device 21 in the form of one or more cleaning rollers 15, 21 can be assigned to the transfer ribbon 12 and a cleaning device 28 for example in the form of a nonwoven cleaning station which can be pivoted on and away, can be assigned to the transfer printing roller 22. The pivoting on and away of the nonwoven cleaning station 28 takes place here under the control of the printer or copier control system as a function of the toner image sequence. Cleaning of the transfer printing roller 22 can then take place with pivoted-on nonwoven cleaning station 28, for example when there is no toner image to be printed on the transfer printing roller 22 or for example during the transfer printing onto the single sheet. By appropriately controlling the sequence of toner images in conjunction with the feeding of the single sheets, cleaning cycles can thus be included within the scope of the printing timing sequence.

Color print mode operation

With the described arrangement, color printing of single sheets is also possible, specifically with a multicolor image on the back and a single-color image on the front or with multi-color images on the back without printing the front.

For this purpose, a sequence of latent character images, associated with partial color images, for the back and a latent character image for the front are produced in the images areas 38 by means of the character generator ZG. These latent character images are then inked in by means of the developer stations EB to EY and the toner images produced in this way are transferred to the transfer ribbon 12. In order to print the back in color, the heated, pasty partial color toner images are then taken up by the transfer printing roller 22 in a superimposing fashion and simultaneously transferred together with a single-color toner image for the front which also adjoins the transfer ribbon 12 to a fed-in single sheet in one operation.

By omitting the toner image for the front, the fed-in single sheets 29 can be color printed in sequence on their back.

In order to print the recording media 29 in color, it is not necessary to change the fusing station 18 and the paper guidance. The selection of color and of the operation modes is made simply by appropriately actuating the character generator ZG, and the developer stations EB to EY.

As a result of the long residence time of the toner images firstly on the transfer ribbon 12 and subsequently on the heated transfer printing roller 22, the fusability of the color toner which is difficult to fuse is improved.

By appropriately actuating the character generator in conjunction with a selective activation of the developer stations EB to EY, mixed operation with different modes of operation is also possible.

Although the present invention has been described with reference to a specific embodiment, those of skill in the art will recognize that changes may be made thereto without departing from the scope and spirit of the invention as set forth in the appended claims.

| List of reference symbols | |
|---|---|
| 10 | Intermediate carrier, photoconductor drum |
| LE | Charging device |
| ZG | Character generator |
| EY | Developer station, yellow |
| EM | Developer station, magenta |
| EC | Developer station, cyan |
| EB | Developer station, black |
| RS | Cleaning station |
| 11 | Transfer station |
| 12 | Transfer ribbon |
| 13 | Deflection roller (heated) |
| 14 | Deflection roller |
| 15 | Cleaning roller |
| 16 | Deflection roller of the transfer station |
| 17 | Deflection roller of the transfer station |
| 18 | Transfer printing and fusing station |
| 19 | Transfer corotrone |
| 20 | Beating station, heating device |
| 21 | Cleaning device, cleaning roller |
| 22 | Transfer printing and fusing element, transfer printing roller |
| 23 | Transfer printing and fusing gap |
| 24 | Hollow roller |
| 25 | Rubber layer |
| 26 | Outer layer |
| 27 | Beating device, radiator |
| 28 | Cleaning device, nonwoven cleaning |
| 29 | Recording medium |
| 30 | Paper conveying channel |

-continued

| List of reference symbols | |
|---|---|
| 31/32 | Recording medium conveying devices |
| 33 | Paper conveying rollers |
| 34 | Supply area |
| 35 | Stacking device |
| 36 | Preheating device |
| 37/1 | Charge image (back) |
| 37/2 | Charge image (front) |
| 38 | Image areas |
| 39/1 | Toner image (back) |
| 39/2 | Toner image (front) |

I claim:

1. An apparatus for printing the front and back of a recording medium in a reproducing device operating according to a transfer printing principle, comprising:

an electrographic device having a photoconductor for producing a sequence of toner images on the photoconductor;

a transfer printing and fusing station having a transfer printing and fusing gap;

a transfer ribbon having electrostatic transfer means for receiving the toner images from the photoconductor and for conveying the toner images to said transfer printing and fusing station;

a heating device for heating the toner images in such a way that they are in a pasty, sticky state;

said transfer printing and fusing gap having said transfer ribbon arranged on one side and a transfer printing and fusing element arranged on an opposite side in such a way that the transfer ribbon and the transfer printing and fusing element are supported elastically on one another, the transfer printing and fusing element and the transfer ribbon having surfaces which receive the toner images of such a quality that on contact with the transfer ribbon, the transfer printing and fusing element removes a toner image which is arranged on the transfer ribbon; and a recording medium conveying means for feeding the recording medium to the transfer printing and fusing gap such that, as the recording medium passes through the gap, the transfer printing and fusing element and the transfer ribbon roll on the recording medium and, the toner images are transferred to the recording medium.

2. The apparatus according to claim 1, wherein said transfer printing and fusing element is constructed as a heated roller.

3. The apparatus according to claim 2, wherein said transfer printing and fusing element has a circumferential length which is sized in accordance with a strictly prescribed consecutive spacing of image areas which receive the toner images on the photoconductor.

4. The apparatus according to claim 3 further comprising a heating device which heats the transfer ribbon.

5. The apparatus according to claim 1, wherein said transfer printing and fusing element is constructed as a heated ribbon.

6. The apparatus according to claim 5, wherein said transfer printing and fusing element has a circumferential length which is sized in accordance with a strictly prescribed consecutive spacing of image areas which receive the toner images on the photoconductor.

7. The apparatus according to claim 6 further comprising a heating device which heats the transfer ribbon.

8. The apparatus according to claim 1, wherein said transfer printing and fusing element has a circumferential length which is sized in accordance with a strictly prescribed consecutive spacing of image areas which receive the toner images on the photoconductor.

9. The apparatus according to claim 8 further comprising a pre-heating means for pre-heating the recording medium before it is fed to the fusing gap.

10. The apparatus according to claim 8 further comprising a heating device which heats the transfer ribbon, 11. The apparatus according to claim 10 further comprising a pre-heating means for pre-heating the recording medium before it is fed to the fusing gap.

12. The apparatus according to claim 1 further comprising a cleaning device assigned to the transfer printing and fusing element and activatable as required.

13. The apparatus according to claim 12 further comprising a heating device which heats the transfer ribbon.

14. The apparatus according to claim 12 further comprising a pre-heating means for pre-heating the recording medium before it is fed to the fusing gap.

15. The apparatus according to claim 1 further comprising a heating device which heats the transfer ribbon.

16. The apparatus according to claim 15 further comprising a pre-heating means for pre-heating the recording medium before it is fed to the fusing gap.

17. The apparatus according to claim 1 further comprising a pre-heating means for pre-heating the recording medium before it is fed to the fusing gap.

18. The apparatus according to claim 1, wherein a surface layer of the transfer ribbon comprises a silicon material; and a surface layer of the transfer printing and fusing element comprises a fluoroplastic material.

19. A method for simultaneously printing the front and back of a recording medium in a reproduction device which operates according to a transfer printing principle, comprising the following steps:

producing a sequence of toner images by means of an electrophotographic process on a photoconductor, a first toner image of the sequence being for a back of a recording medium and a second toner image being for a front of the recording medium;

electrostatically transferring the sequence of toner images to a transfer ribbon;

feeding the sequence of toner images on the transfer ribbon to a transfer printing and fusing station with a transfer printing and fusing gap for receiving the recording medium, on one side of the gap the transfer ribbon is arranged and on the other side of the gap a transfer printing and fusing element is arranged;

heating the toner images to a temperature near to a fusing temperature of the toner material;

transferring the first toner image to the transfer printing and fusing element;

feeding a recording medium to the transfer printing and fusing gap, the transfer printing and fusing element with the first toner image and the transfer ribbon with the second toner image rolling on the recording medium in order to print simultaneously the front and back of the recording medium and to fuse the toner images on the recording medium.

20. The method according to claim 19, wherein the step of producing a sequence of toner images is further defined in that toner images are produced on the photoconductor in image areas which are arranged in a strictly prescribed consecutive spacing, and in that the step of feeding the sequence of toner images is further defined in that the circumferential length of transfer printing and fusing element is selected in accordance with this consecutive spacing.

* * * * *